United States Patent [19]
Naruse

[11] Patent Number: 6,075,809
[45] Date of Patent: Jun. 13, 2000

[54] RECEIVING APPARATUS, RECEIVING METHOD AND TERMINAL UNIT FOR USE WITH RADIO SYSTEM

[75] Inventor: Tetsuya Naruse, Chiba, Japan

[73] Assignee: Sony Corporation, Tokyo, Japan

[21] Appl. No.: 08/998,390

[22] Filed: Dec. 24, 1997

[30] Foreign Application Priority Data

Jan. 6, 1997 [JP] Japan ................................. 9-000394

[51] Int. Cl.[7] ........................... H04J 13/04; H04B 1/707
[52] U.S. Cl. ........................ 375/147; 375/148; 375/150
[58] Field of Search .................... 370/335, 342, 370/479; 375/130, 140, 144, 147, 148, 150, 347, 349

[56] References Cited

U.S. PATENT DOCUMENTS

| | | | |
|---|---|---|---|
| 5,508,708 | 4/1996 | Ghosh et al. | 324/457 |
| 5,627,835 | 5/1997 | Witter | 370/320 |
| 5,764,687 | 6/1998 | Easton | 375/206 |
| 5,818,887 | 10/1998 | Sexton et al. | 375/355 |
| 5,889,815 | 3/1999 | Iwakiri | 375/208 |
| 5,945,948 | 8/1999 | Buford et al. | 342/457 |
| 5,950,131 | 9/1999 | Vilmur | 455/434 |
| 5,956,367 | 9/1999 | Koo et al. | 375/206 |

*Primary Examiner*—Young T. Tse
*Attorney, Agent, or Firm*—Jay H. Maioli

[57] ABSTRACT

While the phase of a PN code is being shifted every predetermined number of chips, correlation values with a received code are obtained. At this point, de-spread signal levels are cumulated and correlation values are obtained. At this point, a threshold value generating circuit generates a threshold value corresponding to the cumulated value of the de-spread signal levels. In other words, as the number of additions increases, the threshold value is increased. Alternatively, the number of additions is normalized and compared with the threshold value. When the cumulated value does not exceed a predetermined threshold value, since the correlation is weak, the current phase is immediately shifted to the next phase.

12 Claims, 15 Drawing Sheets

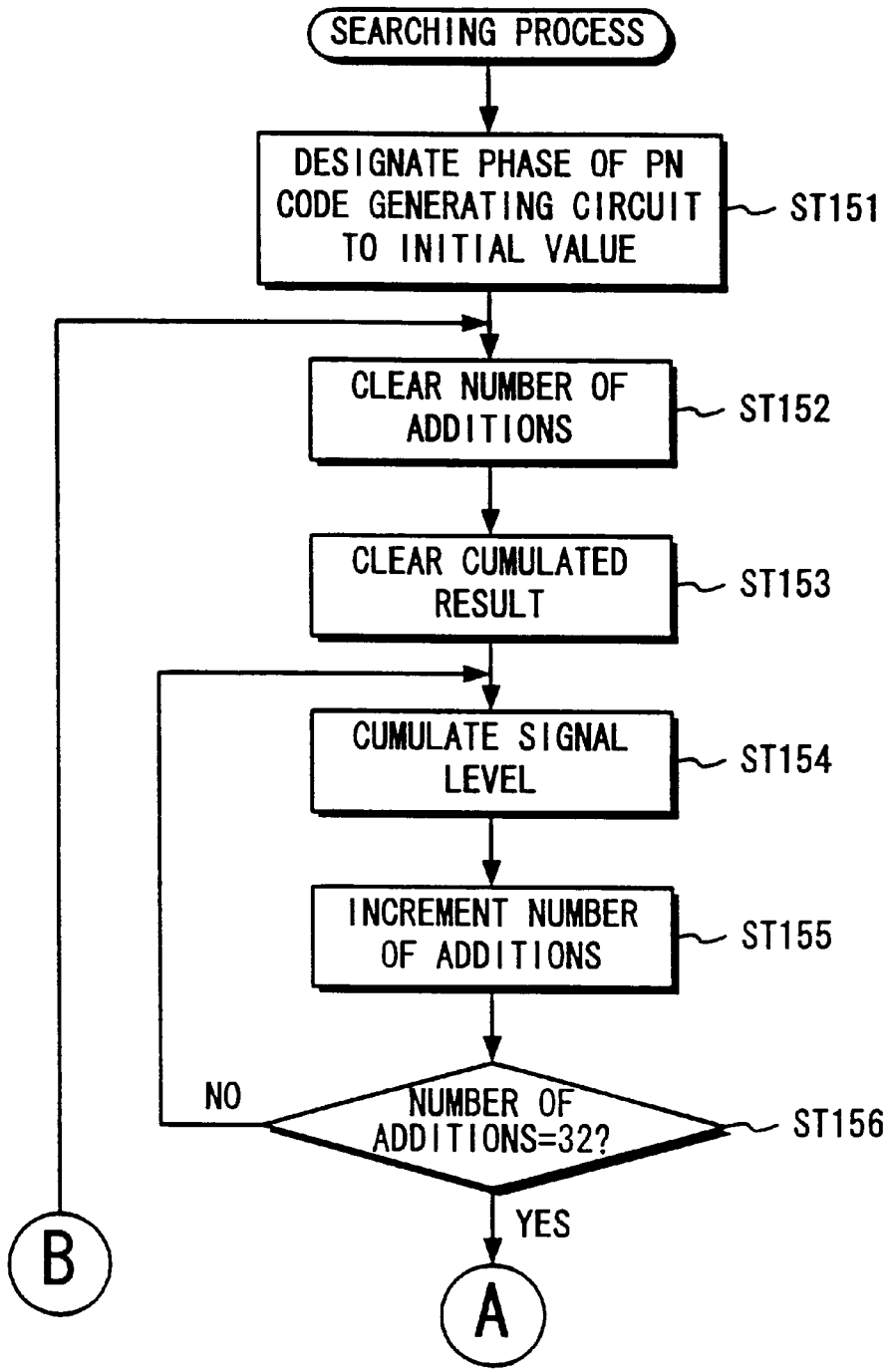

RECEIVING APPARATUS, RECEIVING METHOD AND TERMINAL UNIT FOR USE WITH RADIO SYSTEM

BACKGROUND OF THE INVENTION

1. Field of the Invention

The present invention relates to a receiving apparatus suitable for a CDMA (Code Division Multiple Access) type cellular telephone system, a receiving method thereof, and a terminal unit for use with a radio system thereof.

2. Description of the Related Art

In recent years, a CDMA type cellular telephone system has become attractive. In the CDMA type cellular telephone system, a pseudo-random code is used as a spread code. A carrier of a transmission signal is spectrum-spread. The pattern and phase of each spread code in the code sequence are varied so as to perform a multiple access.

In the CDMA system, the spectrum spread method is used. In the spectrum spread system, when data is transmitted, the carrier is primarily modulated with the transmission data. In addition, the carrier that has been primarily modulated is multiplied by a PN (Pseudorandom Noise) code. Thus, the carrier is modulated with the PN code. As an example of the primarily modulating method, a balanced QPSK modulating method is used. Since the PN code is a random code, when the carrier is modulated by the PN code, the frequency spectrum is widened.

When data is received, the received data is multiplied by the same PN code that has been modulated on the transmission side. When the same PN code is multiplied and the phase is matched, the received data is de-spread and thereby primarily modulated data is obtained. When the primarily modulated data is demodulated, the original data is obtained.

In the spectrum spread method, to de-spread the received signal, the same PN code that has been modulated on the transmission side is required for both the pattern and the phase. Thus, when the pattern and the phase of the PN code are varied, the multiple access can be performed. The method for varying the pattern and the phase of each spread code in the code sequence and thereby performing the multiple access is referred to as the CDMA method.

As cellular telephone systems, an FDMA (Frequency Division Multiple Access) system and a TDMA (Time Division Multiple Access) system have been used. However, the FDMA system and the TDMA system cannot deal with a drastic increase of the number of users.

In other words, in the FDMA system, the multiple access is performed on different frequency channels. In an analog cellular telephone system, the FDMA system is usually used.

However, in the FDMA system, since the frequency use efficiency is bad, a drastic increase of the number of users tends to cause channels to run short. When the intervals of channels are narrowed for the increase of the number of channels, the adjacent channels adversely interfere with each other and thereby the sound quality deteriorates.

In the TDMA system, the transmission data is compressed on the time base. Thus, the use time is divided and thereby the same frequency is shared. The TDMA system has been widely used as a digital cellular telephone system. In the TDMA system, the frequency use efficiency is improved in comparison with the simple FDMA system. However, in the TDMA system, the number of channels is restricted. Thus, it seems that as the number of users drastically increases, the number of channels runs short.

On the other hand, the CDMA system has excellent interference resistance. Thus, in the CDMA system, adjacent channels do not interfere with each other. Consequently, the frequency use efficiency improves and more channels can be obtained.

In the FDMA system and the TDMA system, signals tend to be affected by fading due to multi-paths.

In other words, as shown in FIG. 8, a signal is sent from a base station 201 to a portable terminal unit 202 through a plurality of paths. In addition to a path P1 in which a radio wave of the base station 201 is directly sent to the portable terminal unit 202, there are a path P2, a path P3, and so forth. In the path P2, the radio wave of the base station 201 is reflected by a building 203A and sent to the portable terminal unit 202. In the path P3, the radio wave of the base station 201 is reflected by a building 203B and sent to the portable terminal unit 202.

The radio waves that are reflected by the buildings 203A and 203B and sent to the portable terminal unit 202 through the paths P2 and P3 are delayed from the radio wave that is directly sent from the base station 201 to the portable terminal unit 202 through the path P1. Thus, as shown in FIG. 9, signals S1, S2, and S3 reach the portable terminal unit 202 through the paths P1, P2, and P3 at different timings, respectively. When the signals S1, S2, and S3 through the paths P1, P2, and P3 interfere with each other, a fading takes place. In the FDMA system and the TDMA system, the multi-paths cause the signal to be affected by the fading.

On the other hand, in the CDMA system, with the diversity RAKE method, the fading due to the multi-paths can be alleviated and the S/N ratio can be improved.

In the diversity RAKE system, as shown in FIG. 10, receivers 221A, 221B, and 221C that receive signals S1, S2, and S3 through the paths P1, P2, and P3 are disposed, respectively. A timing detector 222 detects codes received through the individual paths. The codes are sent to the receivers 221A, 221B, 221C corresponding to the paths P1, P2, and P3, respectively. The receivers 221A, 221B, and 221C demodulate the signals received through the paths P1, P2, and P3. The received output signals of the receivers 221A, 221B, and 221C are combined by a combining circuit 223.

In the spectrum spread system, signals received through different paths are prevented from interfering with each other. The signals received through the paths P1, P2, and P3 are separately demodulated. When the demodulated output signals received through the respective paths are combined, the signal intensity becomes large and the S/N ratio improves. In addition, the influence of the fading due to the multi-paths can be alleviated.

In the above-described example, for simplicity, with the three receivers 221A, 221B, and 221C and the timing detector 222, the structure of the diversity RAKE system was shown. However, in reality, in a cellular telephone terminal unit of diversity RAKE type, as shown in FIG. 11, fingers 251A, 251B, and 251C, a searcher 252, and a data combiner 253 are dispose d. The fingers 251A, 251B, and 251C obtain demodulated output signals for the respective paths. The searcher 252 detects signals through multi-paths. The combiner 253 combines the demodulated data for the respective paths.

In FIG. 11, a received signal as a spectrum spread signal that has been converted into an intermediate frequency is supplied to an input terminal 250. This signal is supplied to a sub-synchronous detecting circuit 255. The sub-synchronous detecting circuit 255 is composed of a multiplying circuit. The sub-synchronous detecting circuit 255 multiplies a signal received from the input terminal 250 by an output signal of a PLL synthesizer 256. An output signal of the PLL synthesizer 256 is controlled with an output signal of a frequency combiner 257. The sub-synchronous detecting circuit 255 performs a quadrature detection for the received signal.

An output signal of the sub-synchronous detecting circuit 255 is supplied to an A/D converter 258. The A/D converter 258 converts the input signal into a digital signal. At this point, the sampling frequency of the A/D converter 258 is much higher than the frequency of the PN code that is spectrum-spread. In other words, the input signal of the A/D converter 258 is over-sampled.

An output signal of the A/D converter 258 is supplied to the fingers 251A, 251B, and 251C. In addition, the output signal of the A/D converter 258 is supplied to the searcher 252. The fingers 251A, 251B, and 251C de-spread the signals received through the respective paths, synchronize the signals, acquire the synchronization of the received signals, demodulate the data of these signals, and detect frequency errors of the signals.

The searcher 252 acquires the codes of the received signals and designates the codes of the paths to the fingers 251A, 251B, and 251C. In other words, the searcher 252 has a de-spreading circuit that multiplies a received signal by a PN code and de-spreads the signal. In addition, the searcher 252 shifts the phase of the PN code and obtains the correlation with the received code under the control of the controller 254. With the correlation between a designated code and a received code, a code for each path is determined.

An output signal of the searcher 252 is supplied to the controller 254. The controller 254 designates the phases of the PN codes for the fingers 251A, 251B, and 251C corresponding to the output signal of the searcher 252. The fingers 251A, 251B, and 251C de-spread the received signals and demodulate the received signals received through the respective phases corresponding to the designated phases of the PN codes.

The demodulated data is supplied from the fingers 251A, 251B, and 251C to the data combiner 253. The data combiner 253 combines the received signals received through the respective paths. The combined signal is obtained from an output terminal 259.

The fingers 251A, 251B, and 251C detect frequency errors. The frequency errors are supplied to the frequency combiner 257. With an output signal of the frequency combiner 257, the oscillation frequency of the PLL synthesizer 256 is controlled.

In the portable telephone terminal unit of RAKE type, the searcher 252 has the structure as shown in FIG. 12.

In FIG. 12, a digital signal is supplied from the A/D converter 258 (see FIG. 11) to an input terminal 301. As described above, the sampling frequency of the A/D converter 258 is higher than the frequency of a PN code. In other words, the digital signal is over-sampled. The digital signal is supplied from the input terminal 301 to a decimating circuit 302. The decimating circuit 302 decimates the signal received from the input terminal 301. An output signal of the decimating circuit 302 is supplied to a multiplying circuit 303.

A PN code generating circuit 304 generates a PN code that has spread on the transmission side. The phase of the PN code received from the PN code generating circuit 304 can be designated by a controller 254. The PN code received from the PN code generating circuit 304 is supplied to the multiplying circuit 303.

The multiplying circuit 303 multiplies the output signal of the decimating circuit 302 by the PN code received from the PN code generating circuit 304. Thus, the received signal from the input terminal 301 de-spreads. When the pattern and the phase of the received code match the pattern and the phase of the code received from the PN code generating circuit 304, the received signal de-spreads. Thus, the level of an output signal of the multiplying circuit 303 becomes large. The output signal of the multiplying circuit 303 is supplied to a level detecting circuit 307 through a band pass filter 306. The level detecting circuit 307 detects the level of the output signal of the multiplying circuit 303.

An output signal of the level detecting circuit 307 is supplied to an adding circuit 308. The adding circuit 308 cumulates output data a predetermined number of times (for example, 64 times). With the cumulated value of the output data of the level detecting circuit 307, correlation values of the code designated to the PN code generating circuit 304 and the received code are obtained. An output signal of the adding circuit 308 is supplied to a memory 309.

The phase of the PN code received from the PN code generating circuit 304 is shifted every predetermined number of chips. The correlation value is obtained from the output signal of the adding circuit 308 for each phase. The correlation value is stored in the memory 309. After the PN code has been designated for one period, the correlation values stored in the memory 309 are sorted in the order of larger correlation values by the controller 254. For example, three phases with the largest correlation values are selected. The selected phases are designated to the fingers 251A, 251B, and 251C (see FIG. 11).

FIG. 13 is a flow chart showing a process of the searcher. In FIG. 13, the phase of the PN code generating circuit 304 is designated to the initial value (at step ST101). The number of additions is cleared (at step ST102). The cumulated value of the adding circuit 308 is cleared (at step ST103).

When the initial phase is designated to the PN code generating circuit 304, the multiplying circuit 303 de-spreads the received signal with the designated PN code. The adding circuit 308 cumulates the de-spread signal level (at step ST104). Whenever the signal level is cumulated, the number of additions is incremented (at step ST105). Next, it is determined whether or not the number of additions exceeds a predetermined value (for example, 64) (at step ST106). The signal level is cumulated until the number of additions becomes 64. Thus, the correlation value is obtained. When the number of additions becomes 64, the correlation value at the time is stored in the memory 309 (at step ST107).

It is determined whether or not the last phase of the PN code generating circuit 304 has been designated (at step ST108). When the last phase has not been designated, the phase of the PN code is advanced or delayed by a predetermined value (at step ST109). Thereafter, the flow returns to step ST102. With the phase of the PN code that has been shifted for the predetermined value, the above-described process is repeated.

When the phase of the PN code is shifted for one period, at step ST109, the last phase of the PN code has been designated. Thus, the determined result at step ST108 becomes Yes. At this point, the correlation values stored in the memory 309 are sorted and the largest three correlation values are obtained (at step ST110). The three phases corresponding to the three largest correlation values are designated to the fingers 251A, 251B, and 251C (at step ST111).

In the example of the searcher shown in FIG. 12, de-spread levels are added 64 times for all phases of each PN code so as to obtain a correlation value. Thus, the search time becomes long. When the number of additions is decreased, although the search time becomes short, the accuracy of the correlation values deteriorates.

To solve this problem, the number of additions is designated to 32. It is determined whether or not each correlation value exceeds a predetermined threshold value. Only when each correlation value exceeds the predetermined threshold value, more than 32 additions are performed so as to obtain a correlation value. Thus, the searching process can be quickly performed without a deterioration of the accuracy. FIG. 14 shows an example in which the speed of the searching process is increased in such a manner.

In FIG. 14, a digital signal is supplied from the A/D converter 258 to an input terminal 351. The digital signal is supplied from the input terminal 351 to a decimating circuit 352. The decimating circuit 352 decimates the signal received from the input terminal 351. An output signal of the decimating circuit 352 is supplied to a multiplying circuit 353.

A PN code generating circuit 354 generates a PN code that has spread on the transmission side. The phase of the PN code received from the PN code generating circuit 354 can be designated by a controller 254. The PN code received from the PN code generating circuit 354 is supplied to the multiplying circuit 353.

The multiplying circuit 353 multiplies the output signal of the decimating circuit 352 by the PN code received from the PN code generating circuit 354. Thus, the received signal from the input terminal 351 de-spreads with the code received from the PN code generating circuit 354. When the pattern and the phase of the received code match the pattern and the phase of the code received from the PN code generating circuit 354, the received signal de-spreads. Thus, the level of an output signal of the multiplying circuit 353 becomes large. The output signal of the multiplying circuit 353 is supplied to a level detecting circuit 357 through a band pass filter 356. The level detecting circuit 357 detects the level of the output signal of the multiplying circuit 353.

An output signal of the level detecting circuit 357 is supplied to an adding circuit 358. The adding circuit 358 cumulates output data of the level detecting circuit 357. With the cumulated value of the output data of the level detecting circuit 357, correlation values of the code designated to the PN code generating circuit 354 and the received code are obtained.

The output signal of the level detecting circuit 357 is cumulated for example 32 times (namely, 32 additions are performed) by the adding circuit 358. An output signal of the adding circuit 358 is supplied to a comparator 362. The comparator 362 determines whether or not the value of the output signal of the adding circuit 358 exceeds a predetermined threshold value. When the value of the output signal is less than the predetermined threshold value, since a small correlation value is not necessary, it is determined that there is almost no correlation in the current phase. The phase of the PN code generating circuit 354 is shifted to the next phase. Only when the value exceeds the predetermined threshold value, the output signal of the level detecting circuit 357 is cumulated more than 32 times so as to accurately detect a correlation value. The output signal of the adding circuit 358 is supplied to a memory 359.

The phase of the PN code received from the PN code generating circuit 354 is shifted every predetermined number of chips. The correlation value is obtained from the output signal of the adding circuit 358 for each phase. The number of additions of the adding circuit 358 is for example 32. When the cumulated value is equal to or less than the predetermined threshold value, it is determined that the correlation is weak. In this case, the phase of the PN code generating circuit 354 is shifted to the next phase. Only when the cumulated value exceeds the predetermined threshold value, more than 32 additions are performed. The correlation value is stored in the memory 359. After the phases of the PN code have been designated for one period, for example three paths are selected in the order of larger correlation values. Codes of the three paths are designated to the fingers 25A, 25B, and 25C.

FIGS. 15A and 15B are flow charts showing another example of the process of the above-described searcher. In FIGS. 15A and 15B, the phase of the PN code generating circuit 354 is designated to the initial value (at step ST151). The number of additions is cleared (at step ST152). The cumulated result of the adding circuit 358 is cleared (at step ST153).

When the initial phase is designated to the PN code generating circuit 354, the multiplying circuit 353 de-spreads the received signal with the designated PN code. The adding circuit 358 cumulates the de-spread signal level (at step ST154). Whenever the signal level is cumulated, the number of additions is incremented (at step ST155). Next, it is determined whether or not the number of additions exceeds a predetermined value (for example, 32) (at step ST156). The signal level is cumulated until the number of additions becomes 32.

When the number of additions becomes 32 as the determined result at step ST156, it is determined whether or not the cumulated result exceeds a predetermined threshold value (at step ST157). When the cumulated result does not exceed the predetermined threshold value, it is determined that the correlation is weak (at step ST158). In addition, it is determined whether or not the last phase of the PN code generating circuit 354 has been designated (at step ST159). When the last phase has not been designated, the phase of the PN code is advanced or delayed by a predetermined value (for example ½ chip) (at step ST160). Thereafter, the flow returns to step ST152. With the phase of the PN code that has been shifted for the predetermined value, the above-described process is repeated.

When the cumulated result exceeds the predetermined threshold value as the determined result at step ST157, additions are continued (at step ST162). Whenever one addition is performed, the number of additions is incremented (at step ST162). It is determined whether or not the number of additions becomes a predetermined value (for example, 64) (at step ST163). The signal level is cumulated until the number of additions becomes for example 64. When the number of additions becomes 64, the current correlation value is stored in the memory 359 (at step ST164).

It is determined whether or not the last phase of the PN code generating circuit 354 has been designated (at step ST159). When the last phase has not been designated, the phase of the PN code is advanced or delayed by a predetermined value (for example ½ chip) (at step ST160). Thereafter, the flow returns to step ST152. With the phase of the PN code that has been shifted for the predetermined value, the above-described process is repeated.

When the phase of the PN code is shifted for one period, it is determined that the last phase of the PN code has been designated at step ST159. At this point, correlation values stored in the memory 359 are sorted and phases corresponding to the three largest correlation values are obtained (at step ST165). The three phases corresponding to the three largest correlation values are designated to the fingers 251A, 251B, and 251C (at step ST166).

It is assumed that the number of additions is designated to a predetermined value (for example, 32). It is determined whether or not a correlation value exceeds a predetermined threshold value. Only when the correlation value exceeds the predetermined threshold value, a predetermined number of additions (for example, 32 additions) are additionally performed so as to obtain a correlation value. Thus, when the correlation is weak, additions are not repeatedly performed. Consequently, the searching process can be performed at high speed without deterioration of the accuracy. However, in this case, the number of additions should be properly designated.

In other words, in the stage of which the number of additions is small, when the cumulated value that is output from the adding circuit 358 is compared with the predetermined threshold value, if the correlation with a received signal is strong and the received signal is affected by noise, it is mistakenly determined that the correlation is weak. Thus, the correlation value in this phase may not be obtained. In contrast, when the number of additions becomes large, if the cumulated value that is output from the adding circuit 358 is compared with the predetermined threshold value, additions are meaninglessly repeated. Thus, the searching process cannot be performed at high speed.

OBJECTS AND SUMMARY OF THE INVENTION

Therefore, an object of the present invention is to provide a receiving apparatus, a receiving method, and a terminal unit for use with a radio system, each of which can designate a threshold value corresponding to the number of additions in the searching process, perform the searching process at high speed, and securely designate optimum paths for fingers.

The present invention is a receiving apparatus for receiving a signal that is spectrum-spread with a spread code, comprising a searcher for searching paths of signals received from multi-paths, a plurality of fingers for de-spreading the received signals for the searched paths and demodulating data, and a combiner for combining output data of the fingers, wherein the searcher has a code generating means for generating a code having a phase successively shifted in the same pattern as the spread code that is transmitted, a de-spreading means for multiplying the received signal by the code generated by the code generating means so as to de-spread the spread signal to the original data, a correlation value detecting means for comparing the cumulated value of the output level of the de-spreading means with a predetermined threshold value, for determining that there is almost no correlation when the cumulated value is smaller than the predetermined threshold value, and for cumulating the output level of the de-spreading means and obtaining a correlation value when the cumulated value is larger than the predetermined threshold value, and a means for selecting a plurality of the largest correlation values from those detected by the correlation value detecting means.

The present invention is a receiving method for receiving a signal that is spectrum-spread with a spread code, comprising the steps of causing a searcher to search paths of signals received from multi-paths, causing a plurality of fingers to de-spread the received signals for the searched paths and demodulate data, and causing a combiner to combine output data of the fingers, wherein the searcher generates a code whose phase is successively shifted in the same pattern as the spread code that is transmitted, multiplies the received signal by the code generated by the code generating means so as to de-spread the spread signal to the original data, compares the cumulated value of the output level of the de-spreading means with a predetermined threshold value, determines that there is almost no correlation when the cumulated value is smaller than the predetermined threshold value, and cumulates the output level of the de-spreading means and obtains a correlation value when the cumulated value is larger than the predetermined threshold value; and selects a plurality of the largest correlation values from those detected by the correlation value detecting means.

A terminal unit for use with a radio system for spectrum-spreading a transmission signal with a spread code, transmitting the resultant signal, varying the pattern and phase of a code sequence of the spread code, and performing a multiple-access, comprising a searcher for searching paths of signals received from multi-paths, a plurality of fingers for de-spreading the received signals for the searched paths and demodulating data, and a combiner for combining output data of the fingers, wherein the searcher has a code generating means for generating a code having a phase successively shifted in the same pattern as the spread code that is transmitted, a de-spreading means for multiplying the received signal by the code generated by the code generating means so as to de-spread the spread signal to the original data, a correlation value detecting means for comparing the cumulated value of the output level of the de-spreading means with a predetermined threshold value, for determining that there is almost no correlation when the cumulated value is smaller than the predetermined threshold value, and for cumulating the output level of the de-spreading means and obtaining a correlation value when the cumulated value is larger than the predetermined threshold value, and a means for selecting a plurality of the largest correlation values from those detected by the correlation value detecting means.

When the phase of a PN code is shifted every predetermined number of chips, a correlation value with a received code is obtained. At this point, the de-spread output data is cumulated so as to obtain a correlation value. At this point, a threshold value is designated corresponding to the number of additions. In other words, as the number of additions increases, the threshold value increases. Alternatively, the number of additions is normalized and compared with a predetermined threshold value. When the cumulated value does not exceed the predetermined threshold value, it is assumed that correlation is weak. Thus, the current phase is immediately shifted to the next phase.

The above, and other, objects, features and advantage of the present invention will become readily apparent from the following detailed description thereof which is to be read in connection with the accompanying drawings.

BRIEF DESCRIPTION OF THE DRAWINGS

FIGS. 15A and 15B are flow charts for explaining the another example of the conventional searcher.

DETAILED DESCRIPTION OF THE PREFERRED EMBODIMENTS

Figure 1:
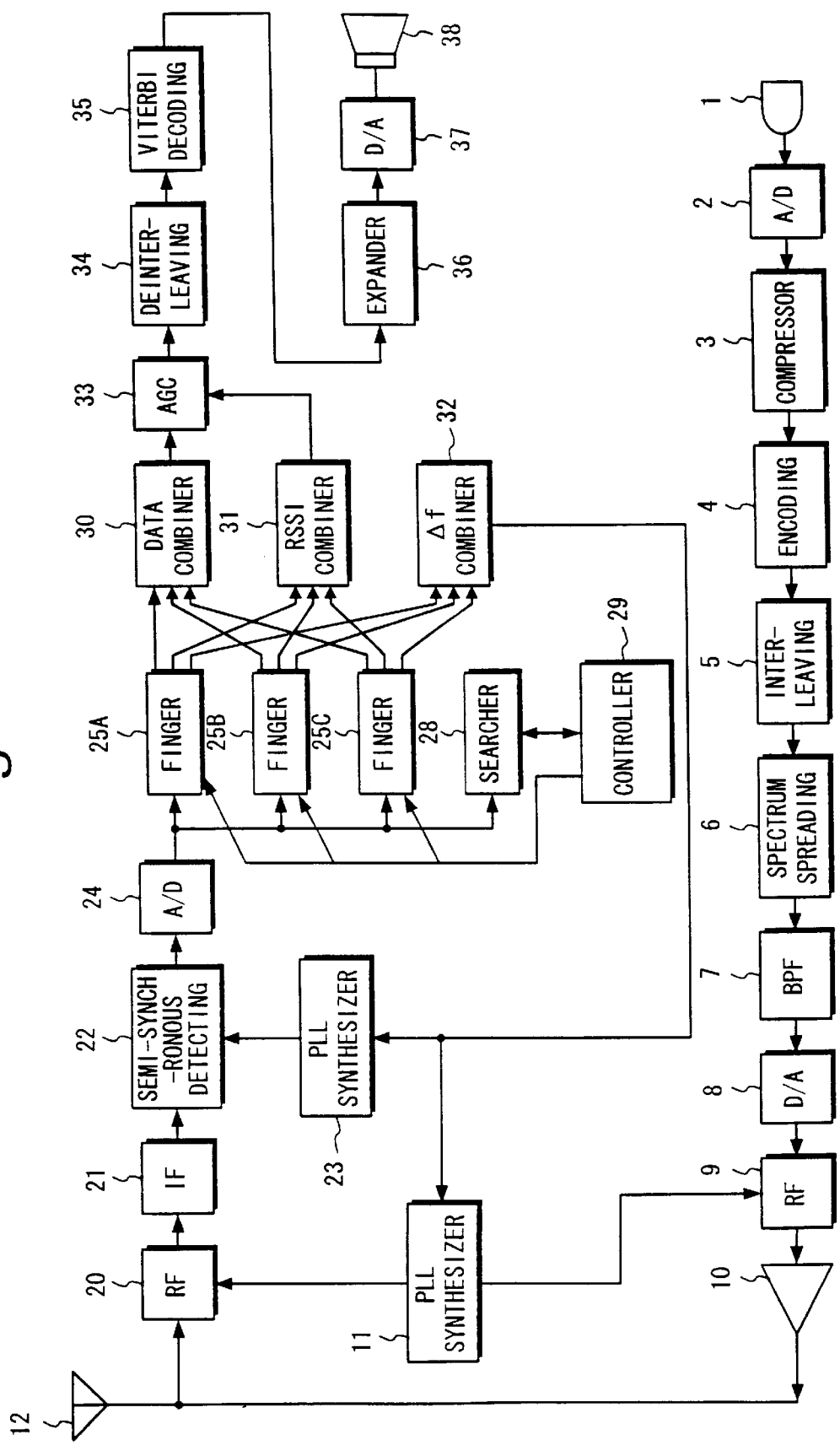
FIG. 1 is a block diagram showing the overall structure of a portable telephone terminal unit of CDMA type according to the present invention.

With reference to the accompanying drawings, an embodiment of the present invention will be described. FIG. 1 is a block diagram showing an example of a portable terminal unit for use with a cellular telephone system of CDMA type according to the present invention. The portable terminal unit uses a diversity RAKE system as the receiving system. In the diversity RAKE system, signals are received from a plurality of paths at the same time. The received signals are combined.

In FIG. 1, in the transmission mode, an audio signal is input to a microphone 1. The audio signal is supplied to an A/D converter 2. The A/D converter 2 converts an analog audio signal into a digital audio signal. An output signal of the A/D converter 2 is supplied to an audio compressing circuit 3.

The audio compressing circuit 3 compresses and encodes the digital audio signal. As examples of the compressing and encoding system, various types have been proposed. For example, a system such the QCELP (Qualcomm Code Excited Linear Coding) system can be used. In the QCELP system, depending on the characteristics of the sound of the user and the congestion state of the communication path, a plurality of encoding speeds can be used. In this case, four encoding speeds (9.6 kbps, 4.8 kbps, 2.4 kbps, and 1.2 kbps) can be selected. To maintain the communication quality, data can be encoded at the minimum speed. It should be noted that the audio compressing system is not limited to the QCELP system.

An output signal of the audio compressing circuit 3 is supplied to a convolutional encoding circuit 4. The convolutional encoding circuit 4 adds an error correction code as a convolutional code to the transmission data. An output signal of the convolutional encoding circuit 4 is supplied to an interleaving circuit 5. The interleaving circuit 5 interleaves the transmission data. An output signal of the interleaving circuit 5 is supplied to a spectrum spreading circuit 6.

The spectrum spreading circuit 6 primarily modulates the carrier and spreads the resultant signal with a PN code. In other words, the spectrum spreading circuit 6 primarily modulates the transmission data corresponding to for example the balanced QPSK modulating method. In addition, the resultant signal is multiplied by a PN code. Since the PN code is a random code, when the PN code is multiplied, the frequency band of the carrier is widened. Thus, the carrier is spectrum-spread. As an example of the modulating method for the transmission data, the balanced QPSK modulating method is used. However, another modulating method can be used in various methods that have been proposed.

An output signal of the spectrum spreading circuit 6 is supplied to a D/A converter 8 through a band pass filter 7. An output signal of the D/A converter 8 is supplied to an RF circuit 9.

A local oscillation signal is supplied from a PLL synthesizer 11 to the RF circuit 9. The RF circuit 9 multiplies the output signal of the D/A converter 8 by the local oscillation signal of the PLL synthesizer 11 and thereby converts the frequency of the transmission signal into a predetermined frequency. An output signal of the RF circuit 9 is supplied to a transmission amplifier 10. After the power of the transmission signal is amplified, the resultant signal is supplied to an antenna 12. A radio wave is sent from the antenna 12 to a base station.

In the reception mode, a radio wave sent from a base station is received by the antenna 12. Since the radio wave sent from the base station is reflected by buildings and so forth, the radio wave reaches the antenna 12 of the portable terminal unit through multi-paths. When the portable terminal unit is used in a car or the like, the frequency of the received signal may vary due to the Doppler effect.

The output signal of the antenna 12 is supplied to an RF circuit 20. The RF circuit 20 receives a local oscillation signal from the PLL synthesizer 11. The RF circuit 20 converts the received signal into an intermediate frequency signal with a predetermined frequency.

An output signal of the RF circuit 20 is supplied to a semi-synchronous detecting circuit 22 through an intermediate frequency circuit 21. An output signal of a PLL synthesizer 23 is supplied to the semi-synchronous detecting circuit 22. The frequency of the output signal of the PLL synthesizer 23 is controlled with an output signal of a frequency combiner 32. The semi-synchronous detecting circuit 22 quadrature-detects the received signal.

An output signal of the semi-synchronous detecting circuit 22 is supplied to an A/D converter 24. The A/D converter 24 digitizes the output signal of the semi-synchronous detecting circuit 22. At this point, the sampling frequency of the A/D converter 24 is higher than the frequency of the PN code that has been spectrum-spread. In other words, the input signal of the A/D converter is over-sampled. An output signal of the A/D converter 24 is supplied to fingers 25A, 25B, and 25C. In addition, the output signal of the A/D converter 24 is supplied to a searcher 28.

As described above, in the reception mode, signals are received through multi-paths. The fingers 25A, 25B, and 25C multiply the signals received through the multi-paths by the PN code so as to de-spread the received signals. In addition, the fingers 25A, 25B, and 25C output the levels of the signals received through the multi-paths and the frequency errors of these multi-paths.

The searcher 28 acquires the codes of the received signals and designates the codes for the paths. In other words, the searcher 28 has a de-spreading circuit that multiplies the received signals by the respective PN codes and de-spreads the received signals. The searcher 28 shifts the phases of the PN codes under the control of a controller 29 and obtains the correlation with the received codes. With the correlation values of the designated codes and the received codes, the codes for the respective paths are designated. The codes designated by the controller 29 are supplied to the fingers 25A, 25B, and 25C.

The received data for the respective paths demodulated by the fingers 25A, 25B, and 25C is supplied to a data combiner 30. The data combiner 30 combines the received data for the respective paths. An output signal of the data combiner 30 is supplied to an AGC circuit 33.

The fingers 25A, 25B, and 25C obtain the intensities of the signals received through the respective paths. The intensities of the signals received through the respective path are supplied from the fingers 25A, 25B, and 25C to a RSSI combiner 31. The RSSI combiner 31 combines the intensities of the signals received through the respective paths. An output signal of the RSSI combiner 31 is supplied to the AGC circuit 33. The gain of the AGC circuit 33 is controlled so that the signal level of the received data becomes constant.

The frequency errors for the respective paths are supplied from the fingers 25A, 25B, and 25C to the frequency combiner 32. The frequency combiner 32 combines the frequency errors for the respective paths. An output signal of the frequency combiner 32 is supplied to the PLL synthesizer 11 and 23. Corresponding to the resultant frequency error, the frequencies of the PLL synthesizer 11 and 23 are controlled.

An output signal of an AGC circuit 33 is supplied to a de-interleaving circuit 34. The de-interleaving circuit 34 de-interleaves the received data that has been interleaved on the transmission side. An output signal of the de-interleaving circuit 34 is supplied to a Viterbi decoding circuit 35. The Viterbi decoding circuit 35 decodes a convolutional code with a soft determining process and a maximum likelihood decoding process. The Viterbi decoding circuit 35 performs an error correcting process. An output signal of the Viterbi decoding circuit 35 is supplied to an audio expanding circuit 36.

The audio expanding circuit 36 decompresses the audio signal that has been compressed with for example the QCELP method and decodes a digital audio signal. The digital audio signal is supplied to a D/A converter 37. The D/A converter 37 restores a digital audio signal to an analog audio signal. The analog audio signal is supplied to a speaker 38.

In the portable telephone terminal unit for use with the CDMA type cellular telephone system according to the present invention, the RAKE system is used. Received signals through a plurality of paths are combined. In the portable telephone terminal unit according to the present invention, the searcher 28 cumulates de-spread values. In addition, the searcher 28 dynamically varies a predetermined threshold value. It is determined whether or not the cumulated value of the de-spread values exceeds the threshold value that has been dynamically varied. Only when the cumulated value exceeds the threshold value, a predetermined number of additions are performed so as to obtain a correlation value. Thus, the searching process can be performed at high speed without deterioration of the accuracy.

Figure 2:
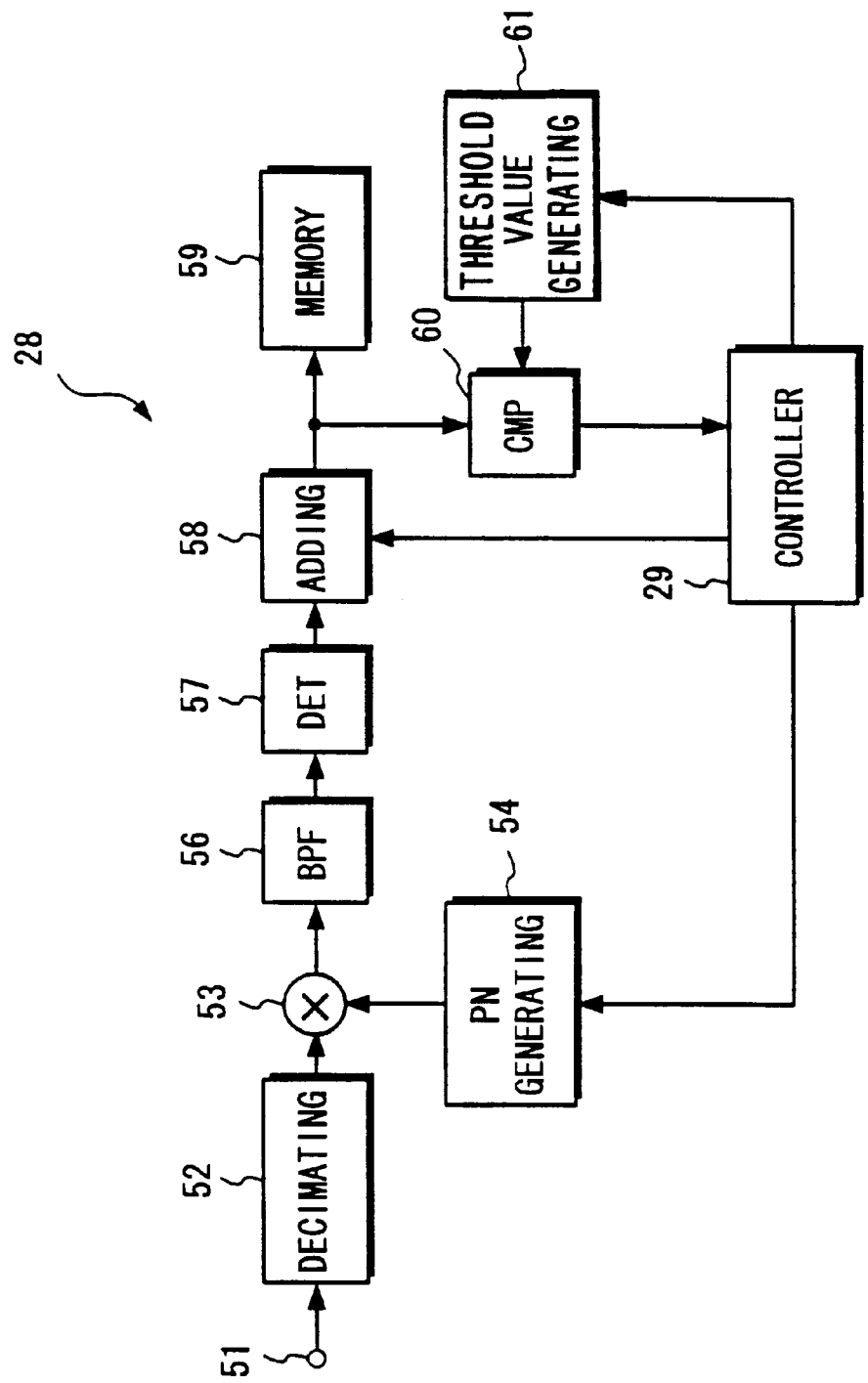
FIG. 2 is a block diagram showing an example of the structure of a searcher of the portable telephone terminal unit of CDMA type according to the present invention.

FIG. 2 is a block diagram showing the structure of the searcher 28 of the portable telephone terminal unit according to the present invention. In FIG. 2, a digital signal is supplied from the A/D converter 24 (see FIG. 1) to an input terminal 51. As described above, the sampling frequency of the A/D converter 24 is higher than the frequency of a PN code. In other words, the digital signal is over-sampled. The digital signal is supplied from the input terminal 51 to a decimating circuit 52. The decimating circuit 52 decimates the signal received from the input terminal 51. An output signal of the decimating circuit 52 is supplied to a multiplying circuit 53.

A PN code generating circuit 54 generates a PN code that has spread on the transmission side. The phase of the PN code received from the PN code generating circuit 54 can be designated by a controller 29. The PN code received from the PN code generating circuit 54 is supplied to the multiplying circuit 53.

The multiplying circuit 53 multiplies the output signal of the decimating circuit 52 by the PN code received from the PN code generating circuit 54. Thus, the received signal from the input terminal 51 de-spreads with the code received from the PN code generating circuit 54. When the pattern and the phase of the received code match the pattern and the phase of the code received from the PN code generating circuit 54, the received signal de-spreads. Thus, the level of an output signal of the multiplying circuit 53 becomes large. The output signal of the multiplying circuit 53 is supplied to a level detecting circuit 57 through a band pass filter 56. The level detecting circuit 57 detects the level of the output signal of the multiplying circuit 53.

An output signal of the level detecting circuit 57 is supplied to an adding circuit 58. The adding circuit 58 cumulates output data a predetermined number of times (for example, 64 times). With the cumulated value of the output data of the level detecting circuit 57, correlation values of the code designated to the PN code generating circuit 54 and the received code are obtained. An output signal of the adding circuit 58 is supplied to a memory 59. In addition, the output signal of the adding circuit 58 is supplied to a comparator 60. A threshold value is supplied from a threshold value generating circuit 61 to the comparator 60. The threshold value is dynamically varied by the controller 29 corresponding to the number of additions performed by the adding circuit 58.

The phase of the PN code received from the PN code generating circuit 54 is shifted every predetermined number of chips (for example, every chip or every ½ chip). The correlation values are obtained from the output signal of the adding circuit 58 for each phase. The correlation values are stored in the memory 59. After the PN code has been designated for one period, for example three phases with the largest correlation values are selected. The selected phases are designated to the fingers 25A, 25B, and 25C (see FIG. 1).

The searcher 28 detects for example three paths with strong correlations. Thus, when correlation values are obtained with output data of the adding circuit 58, it is wasteful to repeat additions for correlation values with weak correlations. To solve this problem, the comparator 60 determines whether or not the output level of the adding circuit 58 is smaller than the threshold value. When the output level of the adding circuit 58 is smaller than the threshold value, it is assumed that the correlation in the current phase is weak. Thus, the current phase is immediately shifted to the next phase. Consequently, the search time can be reduced.

In this example, the threshold value generating circuit 61 generates a threshold value that is dynamically varied corresponding to the number of additions. Thus, whenever the adding circuit 58 cumulates the output data of the level detecting circuit 57, the searcher 28 can determine whether or not the output level of the adding circuit 58 is smaller than the threshold value. Consequently, the searching time can be reduced without deterioration of the reliability.

Figure 3:
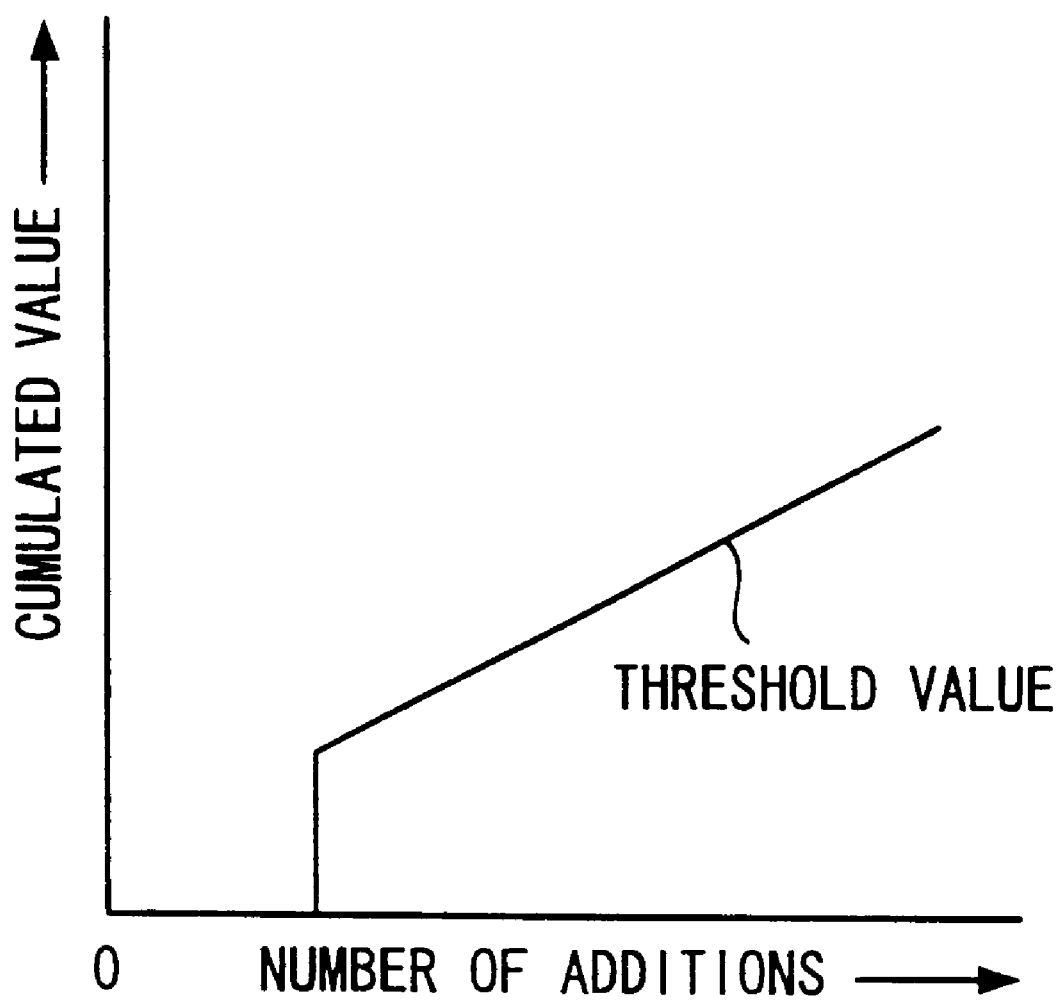
FIG. 3 is a graph for explaining an example of a searcher of the portable telephone terminal unit of CDMA type according to the present invention.

FIG. 3 shows the relation between the number of additions and a threshold value. In this example, as shown in FIG. 3, when the number of additions is small, the threshold value generating circuit 61 generates almost 0 as the threshold value. When the number of additions is larger than a predetermined value, the threshold value generating circuit 61 generates a value that linearly increases corresponding to the number of additions as the threshold value. The threshold value is supplied from the threshold value generating circuit 61 to the comparator 60.

Figure 4A:
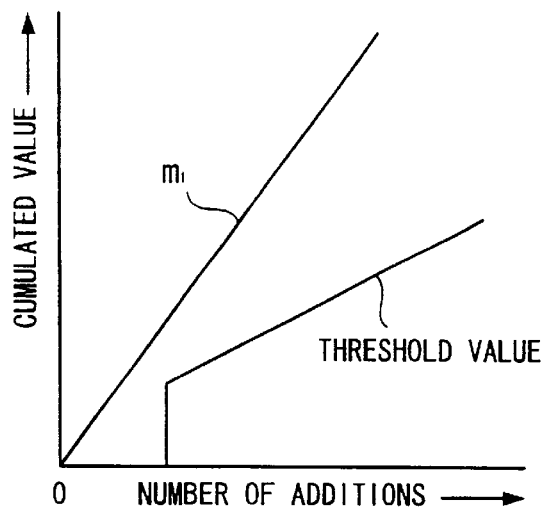
FIGS. 4A to 4C are graphs for explaining an example of a searcher of the portable telephone terminal unit of CDMA type according to the present invention.
Figure 4B:
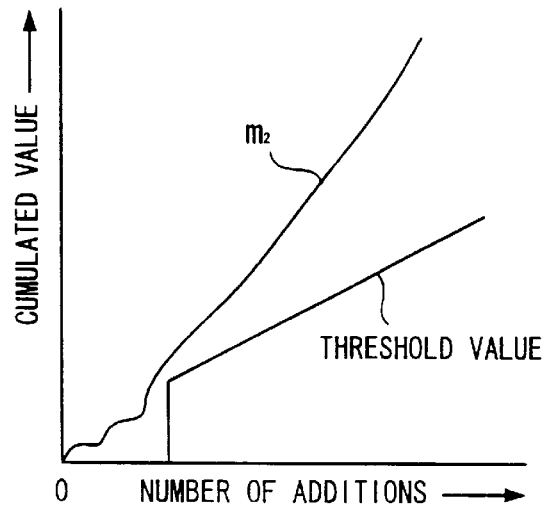
Figure 4C:
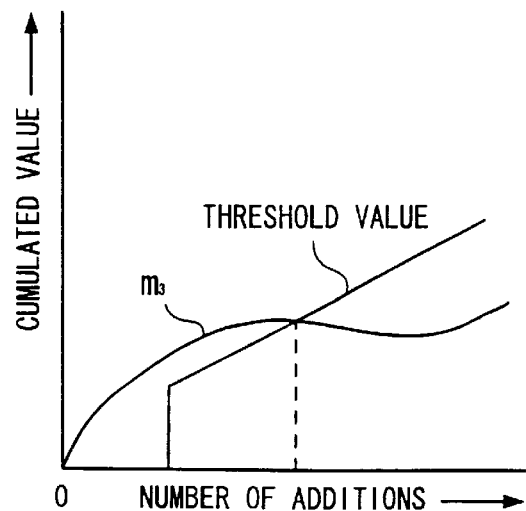

On the other hand, as shown in FIGS. 4A to 4C, the cumulated value that is output from the adding circuit 58 increases corresponding to a correlation value along with the number of additions. FIG. 4A shows the case that the correlation with a received code is very strong. In this case, an output value $m_1$ of the adding circuit 58 varies with a large slope along with the number of additions. Thus, the output value $m_1$ of the adding circuit 58 is always larger than the threshold value regardless of the number of additions. Consequently, additions are continued until the number of additions becomes a predetermined value so as to obtain a correlation value.

FIG. 4B shows the case that the correlation with a received code is strong and a cumulated value is affected by noise in the initial stage of the cumulating operation. In this case, although an output value $m_2$ of the adding circuit 58 varies with a large slope along with the number of additions, the cumulated value is almost zero in the initial stage of the cumulating operation in which the cumulated value tends to be affected by noise. Thus, the output value $m_2$ of the adding circuit 58 is always larger than the threshold value regardless of the number of additions. Consequently, additions are continued until the number of additions becomes a predetermined value so as to obtain a correlation value.

FIG. 4C shows the case that although the correlation with a received code is weak, the cumulated value of the adding circuit 58 is affected by noise in the initial stage of the cumulating operation. In this case, although the slope of an output value $m_3$ of the adding circuit 58 is small, due to an effect of noise or the like, the output value $m_3$ of the adding circuit 58 is large in the initial stage of the cumulating operation. On the other hand, the threshold value linearly increases along with the number of additions. Thus, the output value $m_3$ of the adding circuit 58 is larger than the threshold value in the initial stage of the cumulating operation. However, when the number of additions becomes $n_1$, the output value $m_3$ is less than the threshold value. Thus, when the number of additions becomes $n_1$, it is determined that the correlation is weak. Consequently, the cumulating operation of the current phase is completed. The current phase is shifted to the next phase.

As described above, when the threshold value is dynamically varied along with the number of additions, the searching time can be reduced without deterioration of the reliability.

Figure 5:
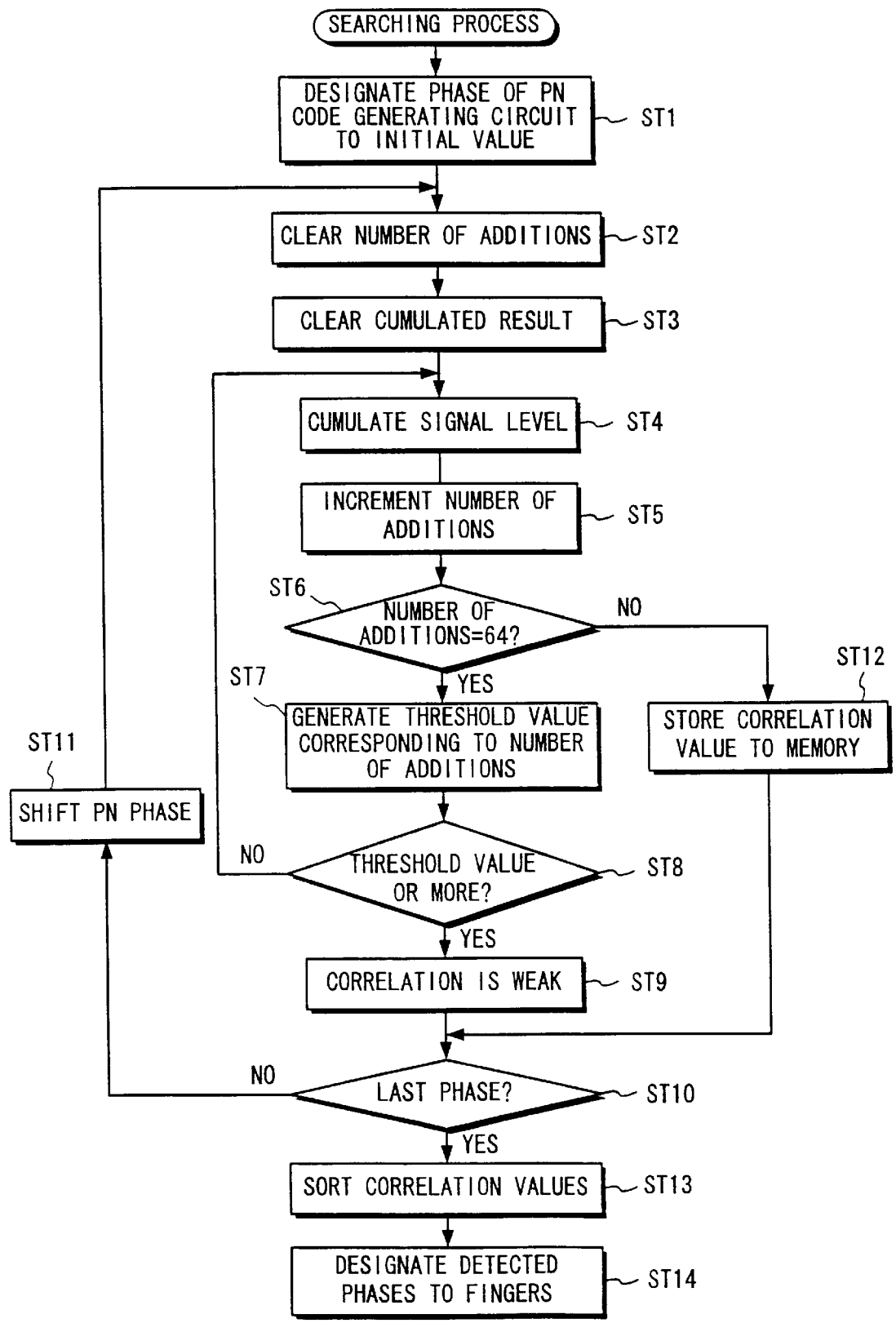
FIG. 5 is a flow chart for explaining an example of the structure of the searcher of the portable telephone terminal unit of CDMA type according to the present invention.

FIG. 5 is a flow chart showing an example of the process of the searcher shown in FIG. 2. In FIG. 5, the phase of the PN code generating circuit 54 is designated to the initial value (at step ST1). The number of additions is cleared (at step ST2). The cumulated value of the adding circuit 58 is cleared (at step ST3).

When the initial phase is designated to the PN code generating circuit 54, the multiplying circuit 53 de-spreads the received signal with the designated PN code. The adding circuit 58 cumulates the de-spread signal level (at step ST4). Whenever the signal level is cumulated, the number of additions is incremented (at step ST5). Next, it is determined whether or not the number of additions exceeds a predetermined value (for example, 64) (at step ST6).

When the number of additions that have been performed does not exceed for example 64, the threshold value generating circuit 61 generates a threshold value corresponding to the number of additions (at step ST7). The threshold value is compared with the output value of the adding circuit 58 (at step ST8). When the output value of the adding circuit 58 is larger than the threshold value corresponding to the number of additions, the flow returns to step ST4. At step ST4, the cumulating operation is repeated.

When the output value of the adding circuit 58 is smaller than the threshold value corresponding to the number of additions as the determined result at step ST8, it is determined that the correlation is weak (at step ST9). It is determined whether or not the last phase of the PN code generating circuit 54 has been designated (at step ST10). When the last phase has not been designated, the phase of the PN code is advanced or delayed by a predetermined value (for example, ½ chip) (at step ST11). Thereafter, the flow returns to step ST2. With the phase of the PN code that has been shifted for the predetermined value, the above-described process is repeated.

When the number of additions that have been performed is 64 as the determined result at step ST6, the correlation value at the time is stored in the memory 59 (at step ST12). It is determined whether or not the last phase of the PN code generating circuit 54 has been designated (at step ST10). When the last phase has not been designated, the phase of the PN code is advanced or delayed by a predetermined value (at step ST11). Thereafter, the flow returns to step ST2. With the phase of the PN code that has been shifted for the predetermined value, the above-described process is repeated.

In such a manner, while the PN code is being shifted every ½ chip, correlation values are obtained. When the phase of the PN code is shifted for one period, at step ST10, it is determined that the last phase has been designated. When the current phase is the last phase as the determined result at step ST10, the correlation values stored in the memory 59 are sorted. The three largest correlation values are obtained (at step ST13). The three phases corresponding to the three largest correlation values are designated to the fingers 25A, 25B, and 25C (at step ST14).

Figure 6:
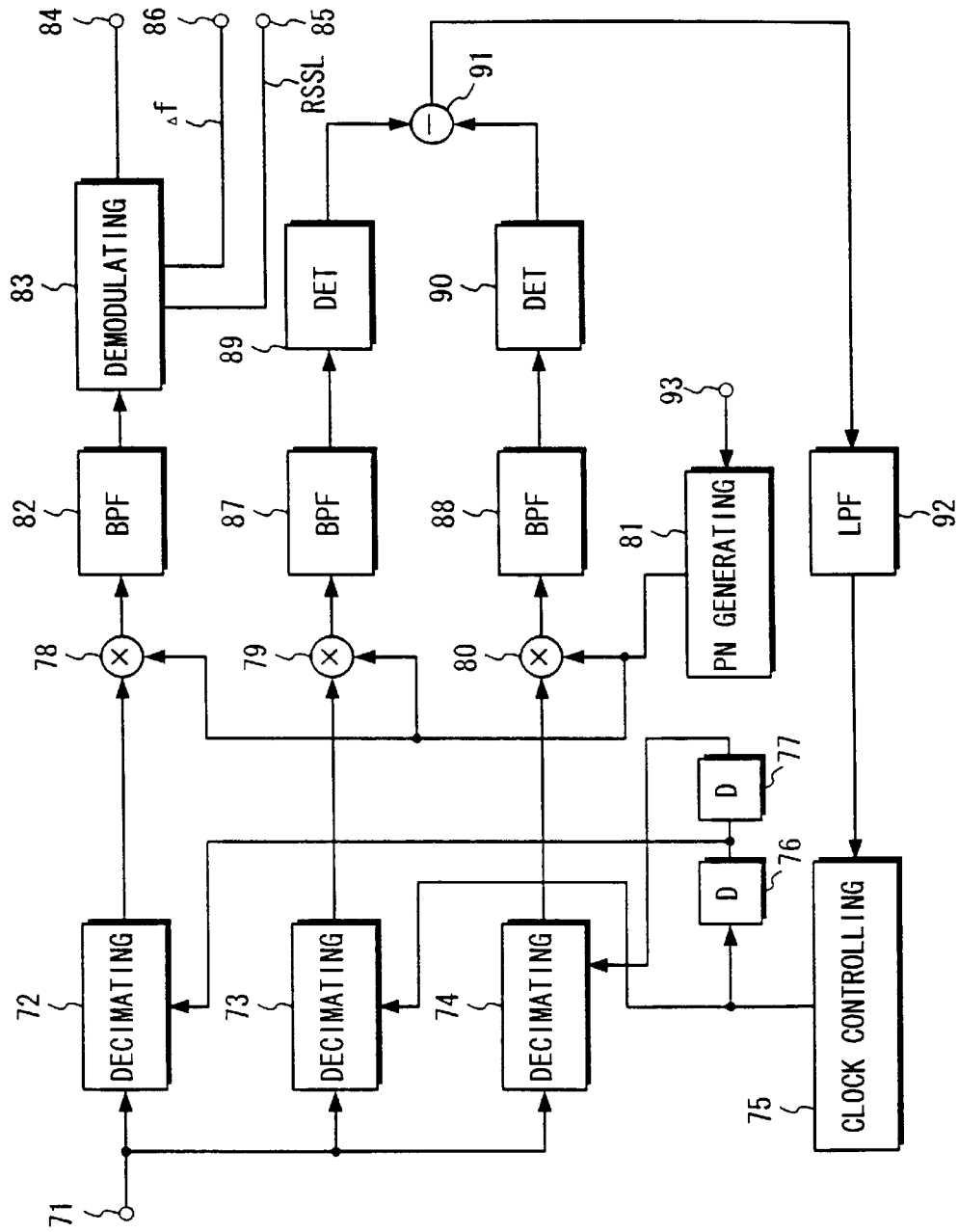
FIG. 6 is a block diagram showing an example of the structure of a finger of the portable telephone terminal unit of CDMA type according to the present invention.

FIG. 6 is a block diagram showing the structure of each of the fingers 25A, 25B, and 25C of the portable telephone terminal unit according to the present invention. In FIG. 6, a digital signal is supplied from the A/D converter 24 (see FIG. 1) to an input terminal 71. As described above, the sampling frequency of the A/D converter 24 is higher than the frequency of the PN code. In other words, the digital signal is over-sampled.

The digital signal is supplied from the input terminal 71 to decimating circuits 72, 73, and 74. A clock is supplied from a clock controlling circuit 75 to the decimating circuit 72 through a delaying circuit 76. The clock from the clock controlling circuit 75 is directly supplied to the decimating circuit 73. The clock from the clock controlling circuit 75 is supplied to the decimating circuit 74 through delaying circuits 76 and 77. Each of the delaying circuits 76 and 77 has a delay amount for ½ chip. The decimating circuits 72, 73, and 74 decimate the digital signal received from the input terminal 71.

Output signals of the decimating circuits 72, 73, and 74 are supplied to multiplying circuits 78, 79, and 80, respectively. The PN code is supplied from a PN code generating circuit 81 to the multiplying circuits 78, 79, and 80. The PN code generating circuit 81 generates the same PN code that has spread on the transmission side.

The multiplying circuit 78 multiplies the output signal of the decimating circuit 72 by an output signal of the PN code generating circuit 81. When the pattern and the phase of the received code match the pattern and the phase of the code received from the PN code generating circuit 81, the multiplying circuit 78 outputs a de-spread signal. An output signal of the multiplying circuit 78 is supplied to a demodulating circuit 83 through a band pass filter 82.

The demodulating circuit 83 demodulates the received signal. The demodulating circuit 83 outputs demodulated data. The demodulated data is output from an output terminal 84. The demodulating circuit 83 detects the level of the received signal. The signal level is obtained from an output terminal 85. The demodulating circuit 83 detects a frequency error. The frequency error is obtained from an output terminal 86.

The multiplying circuits 79 and 80 multiply output signals of the decimating circuits 73 and 74 by the output signal of the PN code generating circuit 81, respectively. The clock of the clock controlling circuit 75 is directly supplied to the decimating circuit 73. The clock supplied from the clock controlling circuit 75 to the decimating circuit 74 is delayed by one chip. Assuming that the phase of the output signal of the decimating circuit 72 is the center phase, an output signal with a phase advanced by ½ chip from the center phase and an output signal with a phase delayed by ½ chip from the center phase are obtained from the decimating circuits 73 and 74, respectively. The multiplying circuits 79 and 80 multiply the signal with the phase advanced by ½ chip from the center phase and the signal with the phase delayed by ½ chip from the center phase by the code received from the PN code generating circuit 81. Thus, de-spread output signals with the phases advanced by ½ chip and delayed by ½ chip from the center phase are obtained. Output signals of the multiplying circuits 79 and 80 are used to form a DLL (Delay Locked Loop).

In other words, the output signals of the multiplying circuits 79 and 80 are supplied to level detecting circuits 89 and 90 through band pass filters 87 and 88, respectively. The level detecting circuits 89 and 90 output the levels of the de-spread signals with the phases advanced by ½ chip and delayed by ½ chip. Output signals of the level detecting circuits 89 and 90 are supplied to a subtracting circuit 91.

The subtracting circuit 91 compares the level of the de-spread signal with the phase advanced by ½ chip and the level of the de-spread signal with the phase delayed by ½ chip. An output signal of the subtracting circuit 91 is supplied to the clock controlling circuit 75 through a loop filter 92. The clock controlling circuit 75 controls the clock supplied to the decimating circuits 72 to 74 so that the level of the output signal of the subtracting circuit 91 becomes 0.

Assuming that an input signal is over-sampled eight times by the A/D converter 24 and that the resultant signal is ⅛ decimated by the decimating circuits 72 to 74, the decimating circuits 72 to 74 output signals at intervals of every eight samples. When it is determined that the current timing is very late corresponding to the output signal of the subtracting circuit 91, the signal is output at intervals of every seven samples instead of every eight samples. Thus, the phase of the signal is advanced.

Initial phase data is supplied from an input terminal 93 to the PN code generating circuit 81. The initial phase data is designated corresponding to a path detected by the searcher 28. Corresponding to the fluctuation of the code, the above-described DLL loop operates so as to acquire the received code.

In the portable telephone terminal unit according to the present invention, the searcher 28 cumulates de-spread values. In addition, the searcher 28 dynamically varies the threshold value corresponding to the number of additions. The searcher 28 determines whether or not the cumulated value of the de-spread values exceeds the threshold value that has been dynamically varied. Only when the cumulated value exceeds the threshold value, the searcher 28 causes the adding circuit to perform a predetermined number of additions so as to obtain a correlation value. Thus, the searching process can be performed at high speed without deterioration of the accuracy.

When a phase searching process is performed, all the phases may be categorized as a plurality of phase groups. In this case, the phase searching process is performed for each group. For example, all the phases are categorized as four groups. The phase searching process is performed for each group. The maximum value of each group is detected. The maximum value of each group is compared. Thus, an optimum phase is determined.

Figure 7:
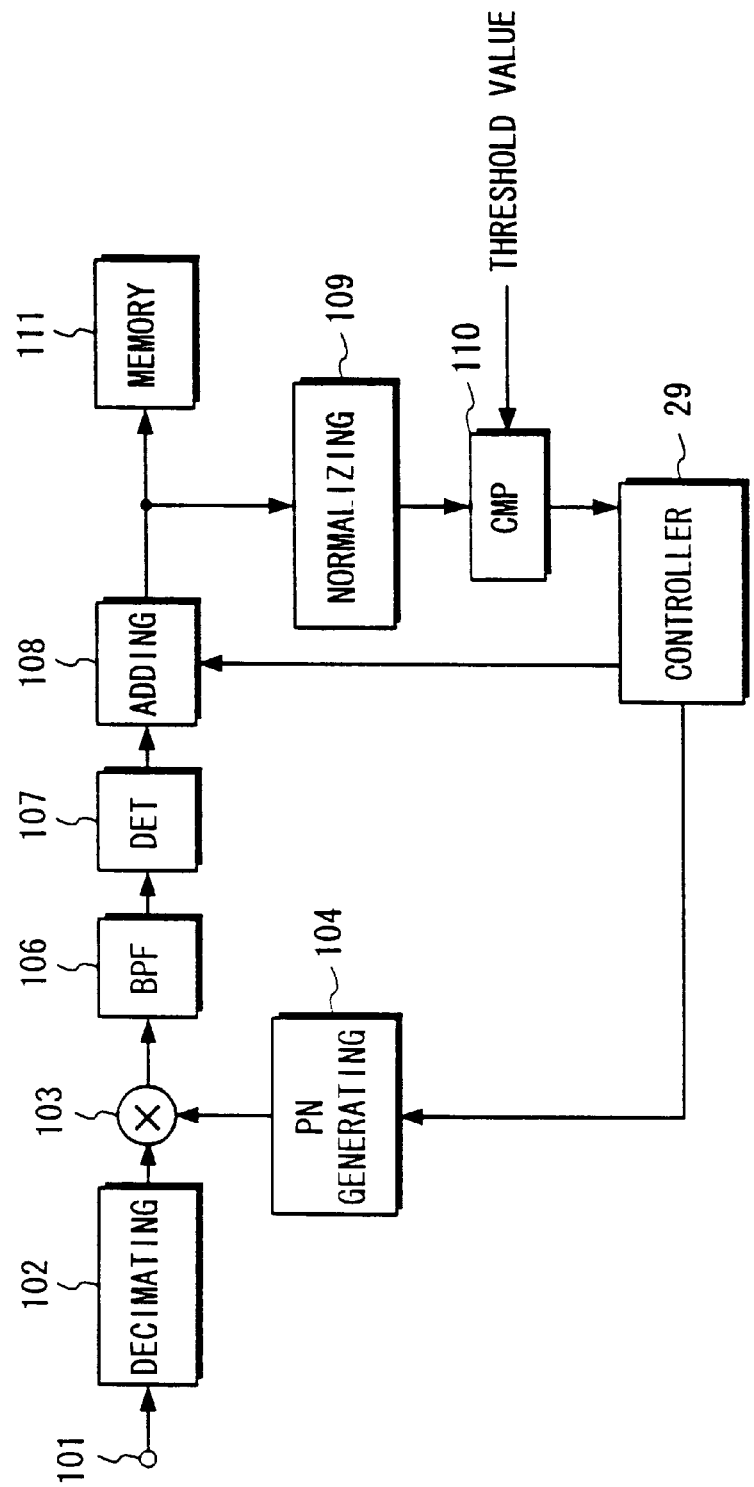
FIG. 7 is a block diagram showing another example of the structure of the searcher of the portable telephone terminal unit of CDMA type according to the present invention.
Figure 8:
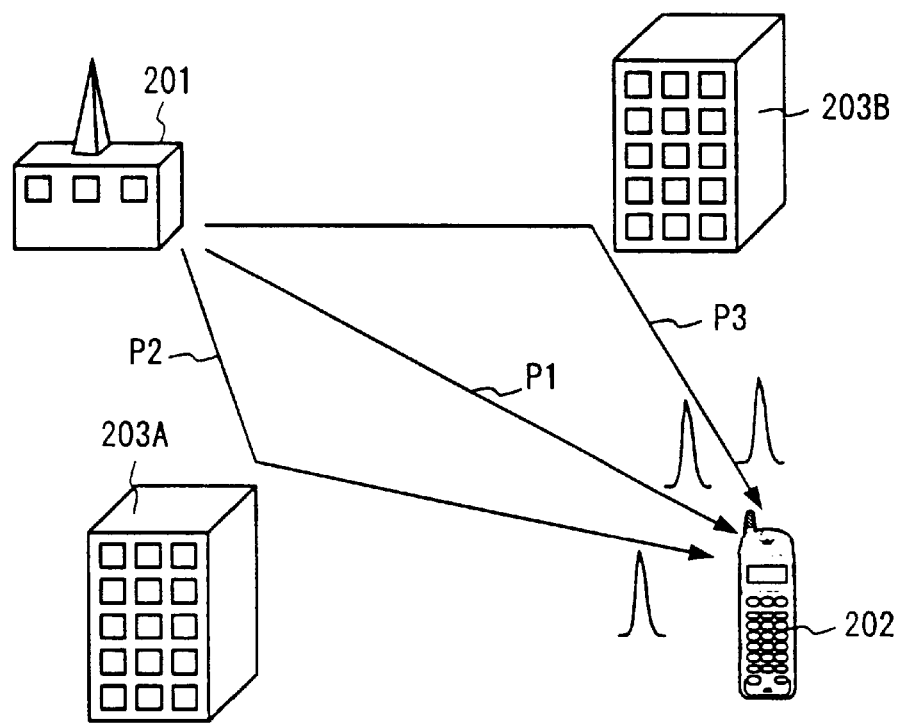
FIG. 8 is a schematic diagram for explaining multi-paths.
Figure 9:
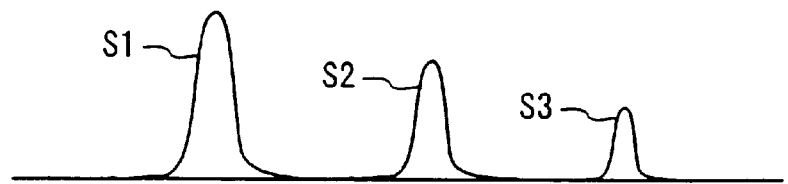
FIG. 9 is a waveforms for explaining multi-paths.
Figure 10:
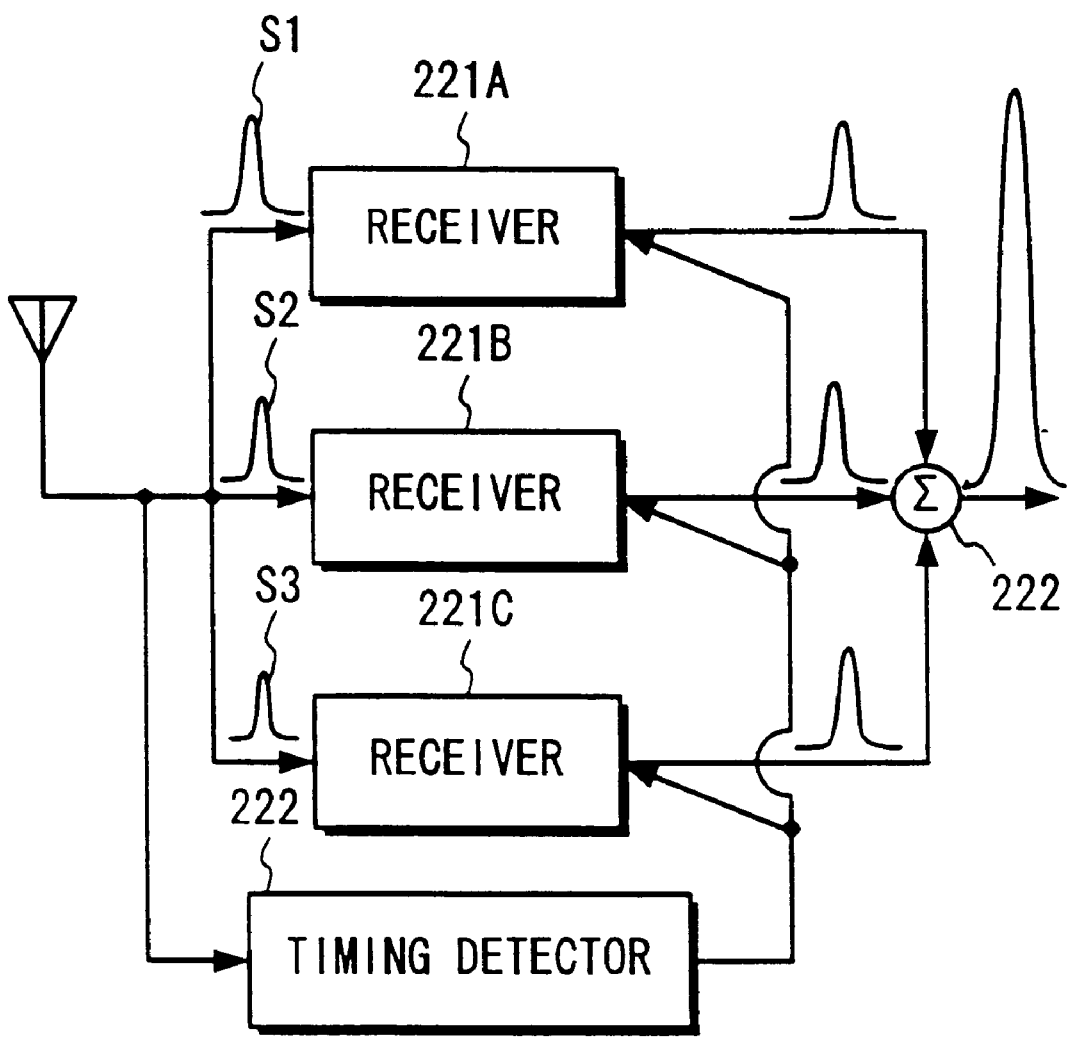
FIG. 10 is a block diagram for explaining a diversity RAKE system.
Figure 11:
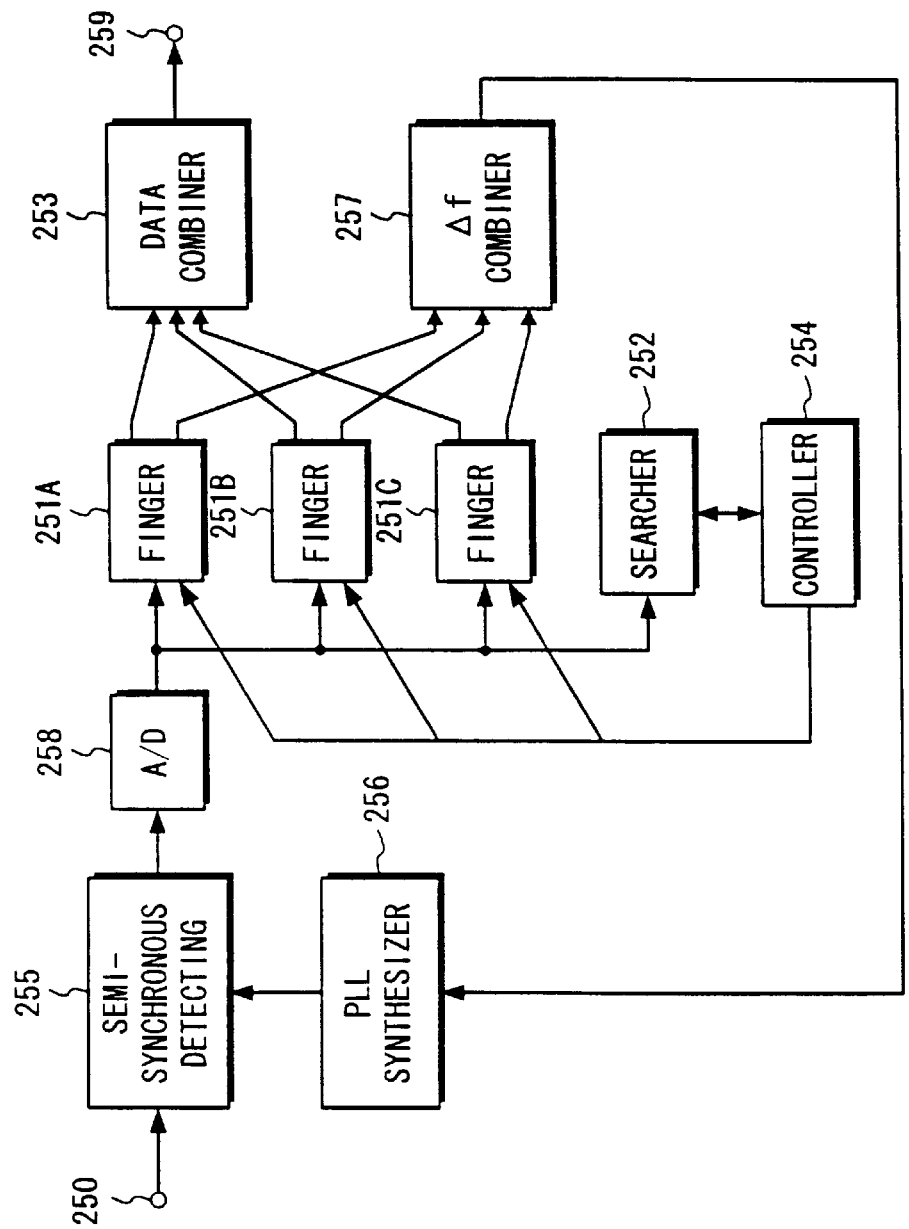
FIG. 11 is a block diagram showing an example of a receiver of the diversity RAKE system.
Figure 12:
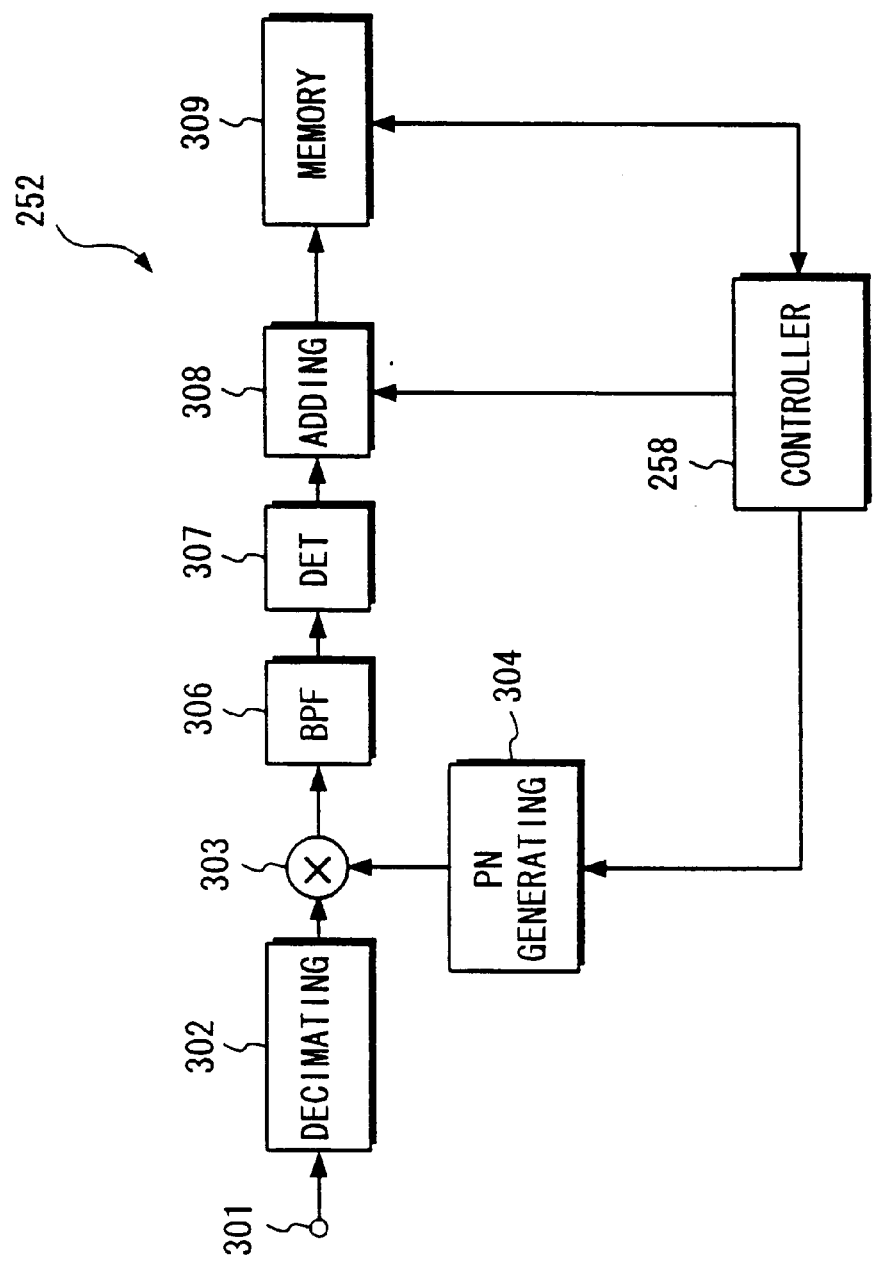
FIG. 12 is a block diagram showing an example of a conventional searcher.
Figure 13:
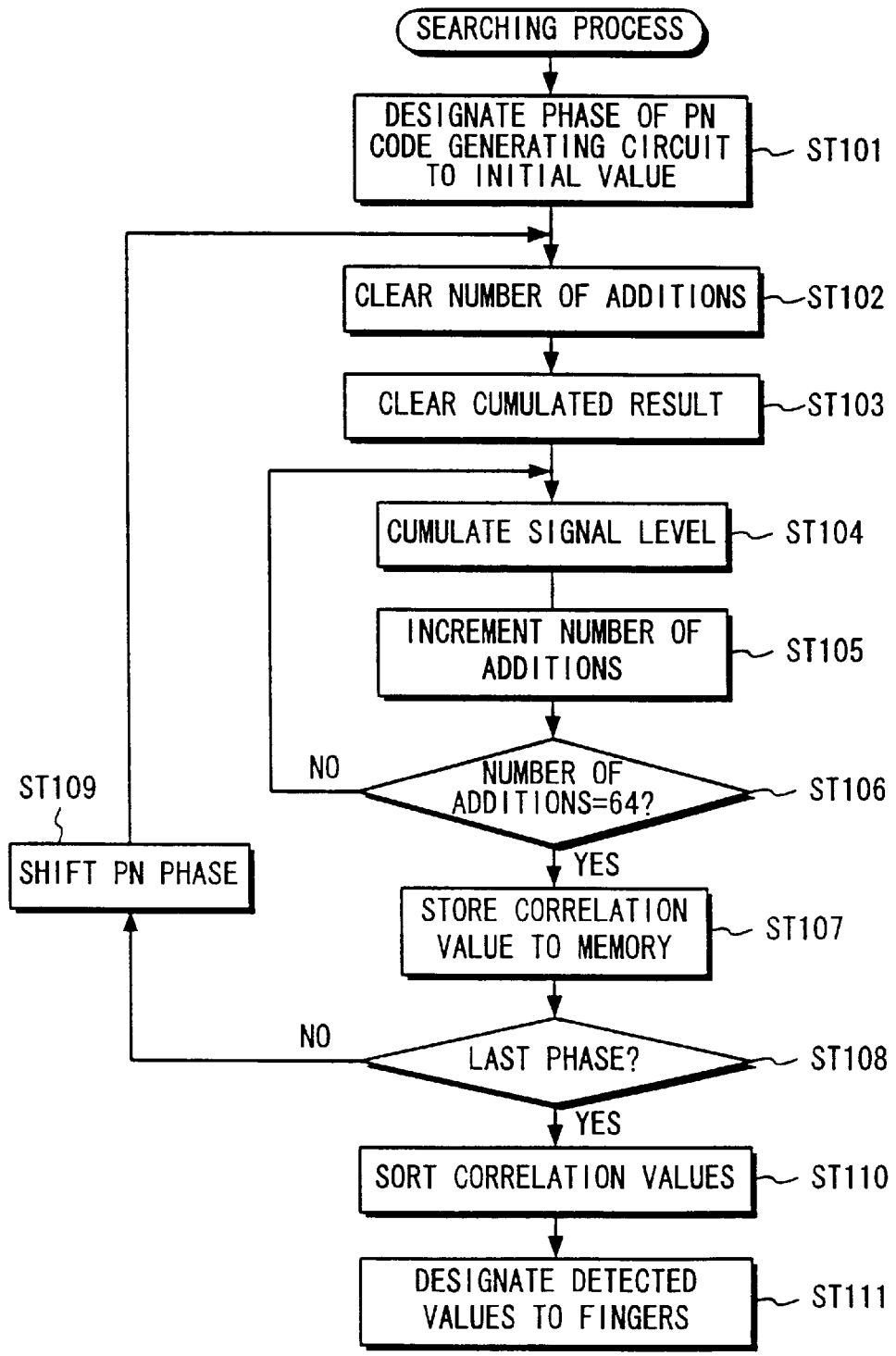
FIG. 13 is a flow chart for explaining the example of the conventional searcher.
Figure 14:
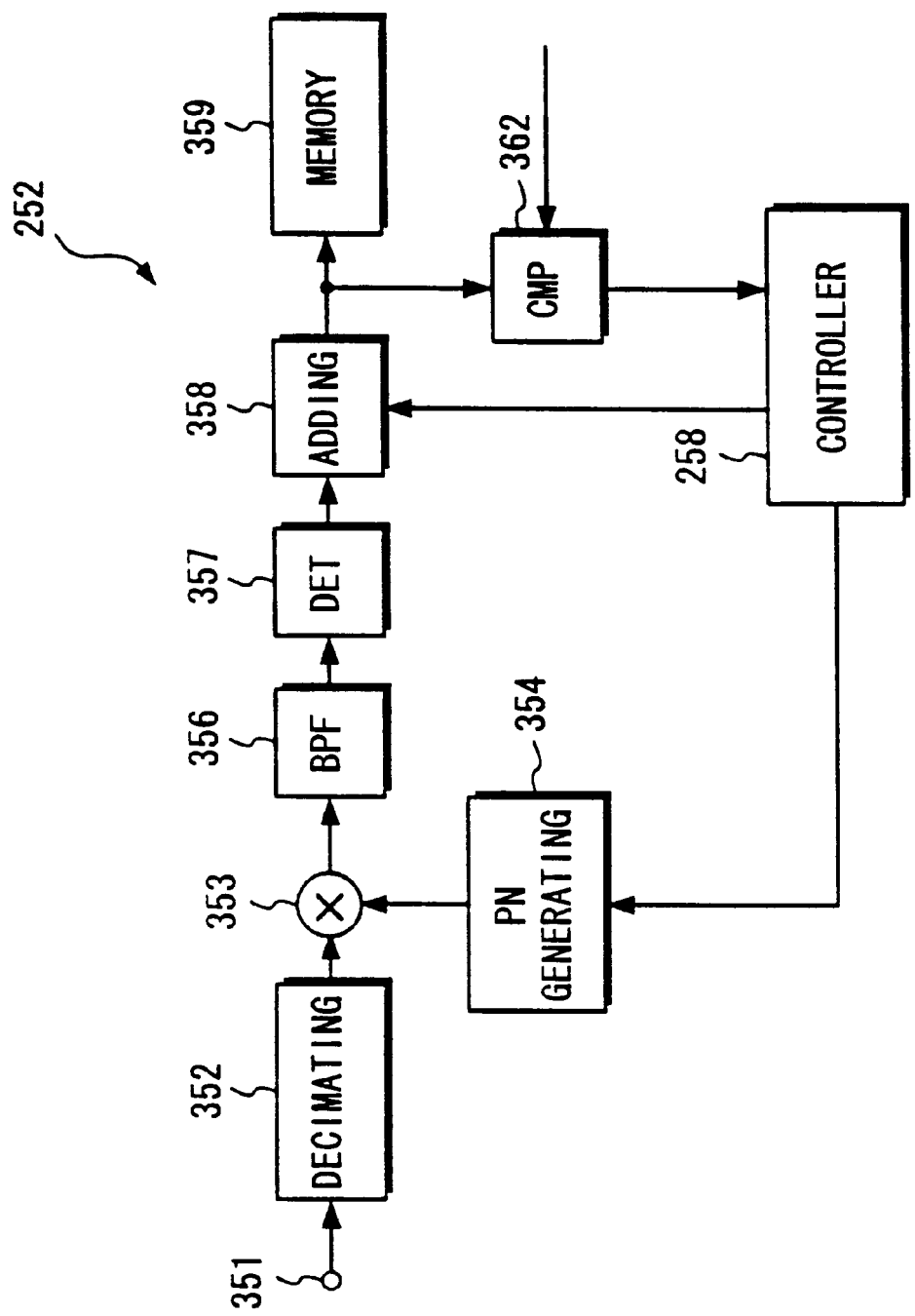
FIG. 14 is a block diagram showing another example of the conventional searcher.
Figure 15B:
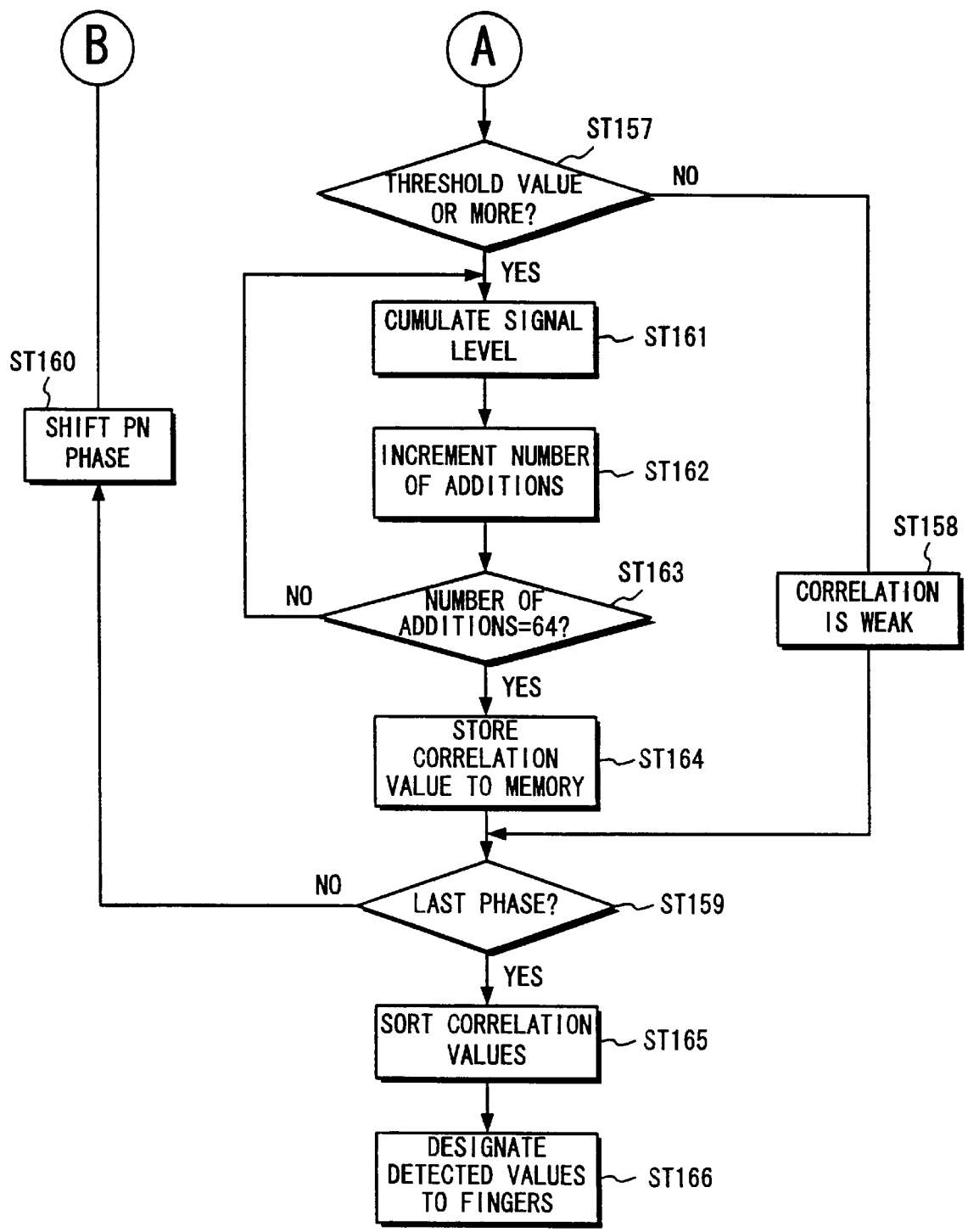

In the example of the searcher 28 shown in FIG. 2, the threshold value is varied corresponding to the number of additions. Alternatively, the threshold value may be constant. The cumulated value is divided by the number of additions so as to normalize the cumulated value. The normalized cumulated value is compared with the constant threshold value. FIG. 7 shows an example of which the searching process is performed at high speed.

In FIG. 7, a digital signal is supplied from the A/D converter 24 to an input terminal 101. The input terminal 101 supplies the digital signal to a decimating circuit 102. The decimating circuit 102 decimates the signal received from the input terminal 101. An output signal of the decimating circuit 102 is supplied to a multiplying circuit 103.

A PN code generating circuit 104 generates the same PN code that has spread on the transmission side. The phase of the PN code that is output from the PN code generating circuit 104 is designated by a controller 29. The PN code is supplied from the PN code generating circuit 104 to the multiplying circuit 103.

The multiplying circuit 103 multiplies the output signal of the decimating circuit 102 by the PN code generated by the PN code generating circuit 104. When the phase and pattern of the received code matches the phase and pattern of the code generated by the PN code generating circuit 104, the received signal despreads. Thus, the output level of the multiplying circuit 103 increases. An output signal of the multiplying circuit 103 is supplied to a level detecting circuit 106 through a band pass filter 107. The level detecting circuit 107 detects the output level of the multiplying circuit 103.

An output signal of the level detecting circuit 107 is supplied to an adding circuit 108. The adding circuit 108 cumulates the output signal of the level detecting circuit 107. With the cumulated value of the output level of the level detecting circuit 107, the correlation values of the code designated to the PN code generating circuit 104 and the received code are obtained.

The cumulated value that is output from the adding circuit 108 is supplied to a normalizing circuit 109. The normalizing circuit 109 normalizes the cumulated value. In other words, the cumulated value that is output from the adding circuit 108 is divided by the number of additions and thereby normalized. The normalized cumulated value is supplied to a comparator 110. The comparator 110 determines whether or not the normalized cumulated value exceeds a predetermined threshold value.

When the normalized cumulated value is less than a predetermined threshold value, it is determined that the correlation in the current phase is almost zero. Thus, the current phase of the PN code generating circuit 104 is immediately shifted to the next phase. Only when the normalized cumulated value exceeds the predetermined threshold value, the adding circuit 108 continues the cumulating operation so as to accurately detect a correlation value.

When the adding circuit 108 performs a predetermined number of additions (for example, 64 additions), a correlation value is obtained with an output value of the adding circuit 108. The correlation value is supplied to the memory 111.

According to the present invention, when the phase of PN code is shifted every a predetermined number of chips and thereby a correlation value with a received code is obtained, a de-spread signal is cumulated so as to obtain a correlation value. The de-spread signal is compared with the threshold value. When the cumulated value does not exceed the threshold value, it is assumed that the correlation is weak. Thus, the current phase is immediately shifted to the next phase. At this point, the threshold value is dynamically varied corresponding to the cumulated value. In other words, as the number of additions that have been performed becomes large, the threshold value is increased. Alternatively, the cumulated value is normalized and then compared with the threshold value. Thus, the searching time can be reduced without deterioration of the accuracy.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A receiving apparatus for receiving a signal spectrum-spread with a first spread code, comprising:
    a searcher for searching paths of signals received from multi-paths;
    a plurality of fingers for de-spreading the received signals for the searched paths and demodulating data; and
    a combiner for combining output data of said plurality of fingers;
    wherein said searcher has
        code generating means for generating a second spread code having a phase that is successively shifted in a same pattern as the first spread code,
        de-spreading means for multiplying the received spectrum-spread signal by the second spread code generated by said code generating means to de-spread the received spectrum-spread signal to original data and supplying a product of the multiplying operation as an output, and
        correlation value detecting means for accumulating a cumulated value of the output of said de-spreading means, comparing the cumulated value with a predetermined threshold value, and when the cumulated value is larger than the predetermined threshold value, obtaining a correlation value for each phase, and selecting a plurality of largest correlation values from those detected.

2. The receiving apparatus as set forth in claim 1, wherein the predetermined threshold value is varied corresponding to a number of additions in the accumulating operation.

3. The receiving apparatus as set forth in claim 1, wherein the predetermined threshold value is a particular value, and the cumulated value is normalized with a number of additions in the accumulating operation.

4. The receiving apparatus as set forth in claim 1, wherein said searcher divides all phases into a plurality of phase groups, detects a maximum value of correlation values for each of the phase groups and supplies the maximum values of the correlation values of the respective phase groups to said plurality of fingers, and said plurality of fingers demodulate the data with a phase that allows the data to be demodulated with the maximum value of each group.

5. A receiving method for receiving a signal spectrum-spread with a first spread code, comprising the steps of:
    searching paths of signals received from multi-paths;
    using a plurality of fingers to de-spread the received signals for the searched paths and demodulate the de-spread received signals to output demodulated data; and
    combining the demodulated data output by the plurality of fingers;
    wherein said searching step further comprises the steps of:
        generating a second spread code having a phase successively shifted in a same pattern as the first spread code,
        multiplying the received spectrum-spread signal by the second spread code to de-spread the spectrum-spread signal to original data and supplying a product of the multiplying operation as an output,
        accumulating a cumulated value of the output of the multiplying operation and comparing the cumulated value with a predetermined threshold value, and when the cumulated value is larger than the predetermined threshold value, obtaining a correlation value for each phase, and selecting a plurality of largest correlation values from said correlation values obtained by said step of accumulating.

6. The receiving method as set forth in claim 5, wherein the predetermined threshold value is varied corresponding to a number of additions in said step of accumulating.

7. The receiving method as set forth in claim 5, wherein the predetermined threshold value is a particular value, and the cumulated value is normalized with a number of additions in said step of accumulating.

8. The receiving method as set forth in claim 5, further comprising the steps of:
    dividing all phases into a plurality of phase groups, and detecting a maximum value of the correlation values for each of the phase groups,
    wherein the demodulated data is demodulated with a phase that allows the de-spread received signals to be demodulated with the maximum value of each group.

9. A terminal unit for use with a radio system for spectrum-spreading a transmission signal with a first spread code, transmitting the spectrum-spread transmission signal, varying a pattern and phase of a code sequence of the first spread code, and performing a multiple-access, comprising:

a searcher for searching paths of signals received from multi-paths;

a plurality of fingers for de-spreading the received signals for the searched paths and demodulating data; and a combiner for combining output data of said plurality of fingers;

wherein said searcher has code generating means for generating a second spread code having a phase successively shifted in a same pattern as the first spread code;

de-spreading means for multiplying the received spectrum-spread signal by the second spread code generated by said code generating means to de-spread the received spectrum spread signal to original data and a product of the multiplying operation as an output;

correlation value detecting means for accumulating a cumulated value of the output of said de-spreading means, comparing the cumulated value with a predetermined threshold value, obtaining a correlation value for each phase, and selecting a plurality of the largest correlation values from correlation values obtained.

10. The terminal unit as set forth in claim 9, wherein the predetermined threshold value is varied corresponding to a number of additions in the accumulating operation.

11. The terminal unit as set forth in claim 9, wherein the predetermined threshold value is a particular value, and the cumulated value is normalized with a number of additions in the accumulating operation.

12. The terminal unit as set forth in claim 9, wherein said searcher divides all phases into a plurality of phase groups, detects a maximum value of the correlation value for each of the phase groups and supplies the maximum values of the correlation values for each of the phase groups to said plurality of fingers, and said plurality of fingers demodulate the data with a phase that allows the data to be demodulated with the maximum value of each group.

* * * * *